(12) United States Patent
Ahn et al.

(10) Patent No.: US 12,452,425 B2
(45) Date of Patent: Oct. 21, 2025

(54) METHOD AND APPARATUS FOR VIDEO CODING USING SPIRAL SCAN ORDER

(71) Applicants: HYUNDAI MOTOR COMPANY, Seoul (KR); KIA CORPORATION, Seoul (KR); DIGITALINSIGHTS INC., Seoul (KR)

(72) Inventors: Yong Jo Ahn, Seoul (KR); Jong Seok Lee, Seoul (KR); Seung Wook Park, Yongin-si (KR)

(73) Assignees: HYUNDAI MOTOR COMPANY, Seoul (KR); KIA CORPORATION, Seoul (KR); DIGITALINSIGHTS INC., Seoul (KR)

( * ) Notice: Subject to any disclaimer, the term of this patent is extended or adjusted under 35 U.S.C. 154(b) by 118 days.

(21) Appl. No.: 18/241,626

(22) Filed: Sep. 1, 2023

(65) Prior Publication Data

US 2023/0412811 A1    Dec. 21, 2023

Related U.S. Application Data

(63) Continuation of application No. PCT/KR2022/003103, filed on Mar. 4, 2022.

(30) Foreign Application Priority Data

Mar. 8, 2021 (KR) .................. 10-2021-0030287
Mar. 4, 2022 (KR) .................. 10-2022-0027878

(51) Int. Cl.
*H04N 19/129* (2014.01)
*H04N 19/105* (2014.01)
(Continued)

(52) U.S. Cl.
CPC ......... *H04N 19/129* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS 11,516,496 B2    11/2022 Lim et al.
2011/0310976 A1*  12/2011 Wang ................ H04N 19/61
                                                      375/E7.176

(Continued)

FOREIGN PATENT DOCUMENTS

JP    2020141285 A    9/2020
KR    101526349 B1    6/2015
(Continued)

OTHER PUBLICATIONS

International Search Report and Written Opinion cited in corresponding international app No. PCT/KR2022/003103; Jun. 14, 2022; 9 pp.

*Primary Examiner* — Christopher G Findley
(74) *Attorney, Agent, or Firm* — Lempia Summerfield Katz LLC

(57) ABSTRACT

A video coding method and an apparatus using a spiral scan order are disclosed. The video coding method and the apparatus perform encode/decode target blocks in a spiral scan order for allowing the blocks located centrally of a video frame to make use of more previously reconstructed neighboring blocks.

16 Claims, 16 Drawing Sheets

(51) Int. Cl.
*H04N 19/119* (2014.01)
*H04N 19/132* (2014.01)
*H04N 19/176* (2014.01)
*H04N 19/423* (2014.01)

(52) U.S. Cl.
CPC ......... *H04N 19/132* (2014.11); *H04N 19/176* (2014.11); *H04N 19/423* (2014.11)

(56) References Cited

U.S. PATENT DOCUMENTS

| | | |
|---|---|---|
| 2012/0106622 A1 | 5/2012 | Huang et al. |
| 2019/0158827 A1* | 5/2019 | Sim ...................... H04N 19/105 |
| 2021/0120261 A1 | 4/2021 | Lim et al. |
| 2021/0136387 A1* | 5/2021 | Van Cao ................ H04N 19/51 |
| 2022/0038681 A1 | 2/2022 | Galpin et al. |
| 2023/0041717 A1 | 2/2023 | Lim et al. |

FOREIGN PATENT DOCUMENTS

| | | |
|---|---|---|
| KR | 20190110960 A | 10/2019 |
| WO | 2020096898 A1 | 5/2020 |

\* cited by examiner

Horizontal Scan Order

Top Left Start

Top Right Start

Bottom Left Start

Bottom Right Start

Vertical Scan Order

Top Left Start

Top Right Start

Bottom Left Start

Bottom Right Start

Clockwise Spiral Scan Order

Top Left Start

Top Right Start

Bottom Left Start

Bottom Right Start

Counterclockwise Spiral Scan Order

Top Left Start

Top Right Start

Bottom Left Start

Bottom Right Start

METHOD AND APPARATUS FOR VIDEO CODING USING SPIRAL SCAN ORDER

CROSS-REFERENCE TO RELATED APPLICATIONS

This application is a Continuation of International Application No. PCT/KR2022/003103 filed on Mar. 4, 2022, which claims priority to Korean Patent Application No. 10-2021-0030287 filed on Mar. 8, 2021, and Korean Patent Application No. 10-2022-0027878 filed on Mar. 4, 2022, the entire disclosures of each of which are incorporated herein by reference.

TECHNICAL FIELD

The present disclosure relates to a video coding method and an apparatus using a spiral scan order.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Conventional video coding techniques perform encoding/decoding after hierarchically partitioning a single frame, as shown in the example of FIG. 6. The video includes a plurality of frames, in which the video encoding apparatus encodes one frame at a time, and the video encoding apparatus decodes one frame at a time in the same encoding sequence. A frame may be hierarchically partitioned into a plurality of blocks. At this time, each layer may be partitioned into blocks of equal size or into blocks of different sizes. Alternatively, each layer may be partitioned into quarter blocks, three blocks, two blocks, etc. by using a tree structure. The blocks in each layer may become units of prediction.

Alternatively, the blocks may become units of a transform. Alternatively, the blocks may be units of quantization. Alternatively, the blocks may be units of filtering. For example, the example of FIG. 6 represents a hierarchical partition of a single frame.

Meanwhile, conventional video coding apparatuses encode/decode the blocks of each layer in a predetermined order. For example, to encode/decode blocks partitioned in a tree structure, a conventional video coding apparatus selectively utilizes a raster scan order and an inverse raster scan. In general, raster scan and inverse raster scan schemes have the advantage that most blocks can utilize information on two already reconstructed neighboring blocks. In other words, the number of already reconstructed neighboring blocks is one of the significant factors that greatly affect the encoding performance of the video. Therefore, to improve the coding efficiency of video, there is a need for taking into account a scan order that can utilize more reconstructed neighboring blocks.

SUMMARY

The present disclosure in some embodiments seeks to a video coding method and an apparatus that encode/decode the target blocks in a spiral scan order to allow the blocks located centrally of a video frame to utilize more already reconstructed neighboring blocks.

At least one aspect of the present disclosure provides a method performed by a video encoding apparatus for encoding a current layer. The method comprises determining a block-scan scheme for the current layer, the block-scan scheme including a location of a start block for blocks in which the current layer is divided into the same size, and a scan order based on the start block. The scan order is one of a horizontal scan order, a vertical scan order, a clockwise spiral scan order, or a counterclockwise spiral scan order. The method also comprises encoding a current block representing each of the blocks following the block-scan scheme. The method also comprises determining reference sample lines for the current block after the encoding. The method also comprises determining line buffers for storing the reference sample lines. The method also comprises storing information on the reference sample lines in the line buffers.

Another aspect of the present disclosure provides a video encoding apparatus. The apparatus comprises a scan determining unit configured to determine a block-scan scheme for a current layer, the block-scan scheme including a location of a start block for blocks in which the current layer is divided into the same size, and a scan order based on the start block. The scan order is one of a horizontal scan order, a vertical scan order, a clockwise spiral scan order, or a counterclockwise spiral scan order. The apparatus also comprises a block encoder configured to encode a current block representing each of the blocks following the block-scan scheme. The apparatus also comprises a reference sample determining unit configured to determine reference sample lines for the current block having been encoded and to determine line buffers for storing the reference sample lines. The apparatus also comprises a reference sample storing unit configured to store information on the reference sample lines in the line buffers.

Yet another aspect of the present disclosure provides a method performed by a video decoding apparatus for decoding a current layer. The method comprises determining block scan information for the current layer, the block scan information including a location of a start block for blocks in which the current layer is divided into the same size, and a scan order based on the start block. The scan order is one of a horizontal scan order, a vertical scan order, a clockwise spiral scan order, or a counterclockwise spiral scan order. The method also comprises decoding a current block representing each of the blocks following the block scan information. The method also comprises determining reference sample lines for the current block after the decoding. The method also comprises determining line buffers for storing the reference sample lines. The method also comprises storing information on the reference sample lines in the line buffers.

As described above, the present disclosure provides a video coding method and an apparatus that encode/decode target blocks in a spiral-scan order, allowing the blocks located centrally of a video frame to utilize more already reconstructed neighboring blocks. Thus, coding efficiency may be improved.

DETAILED DESCRIPTION

Figure 1:
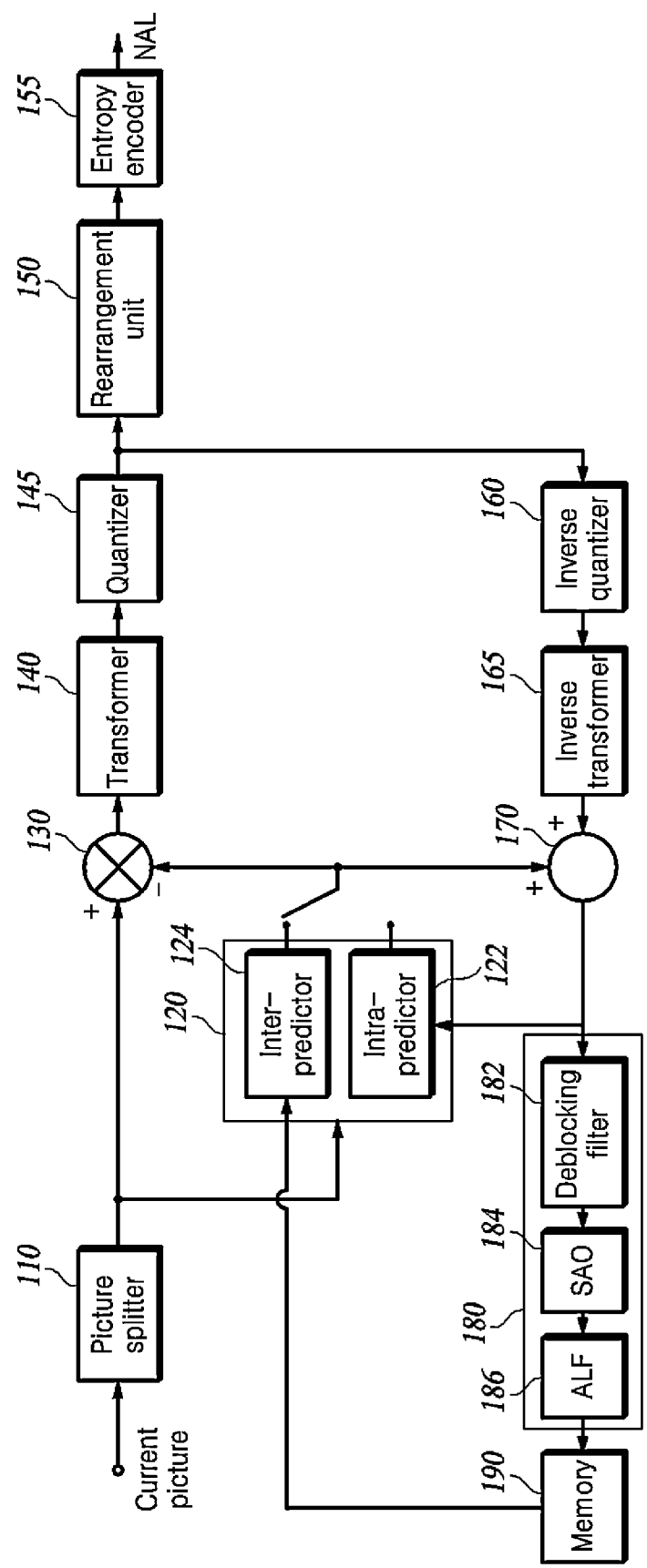
FIG. 1 is a block diagram of a video encoding apparatus according to an embodiment of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus in one embodiment of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units CTUs having a predetermined size and then recursively splits the coding unit (CTU) by using a tree structure. A leaf node in the tree structure becomes the CU, which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
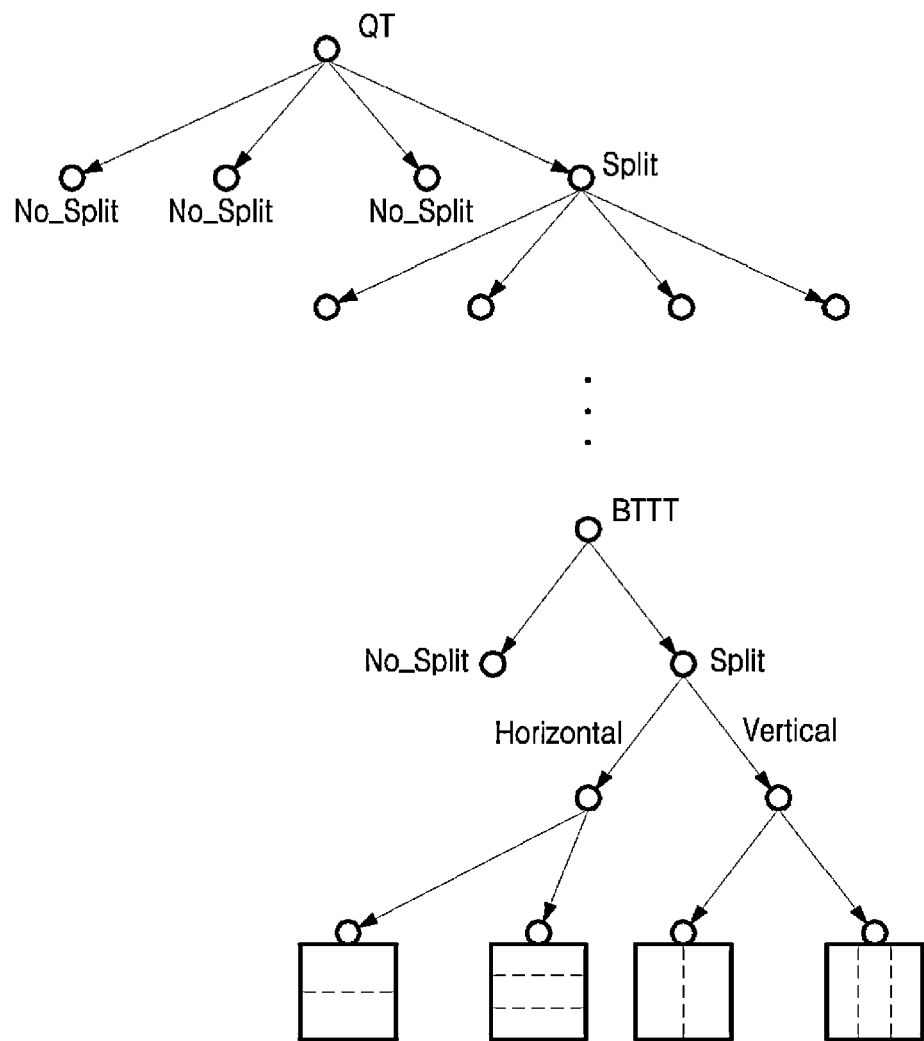
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
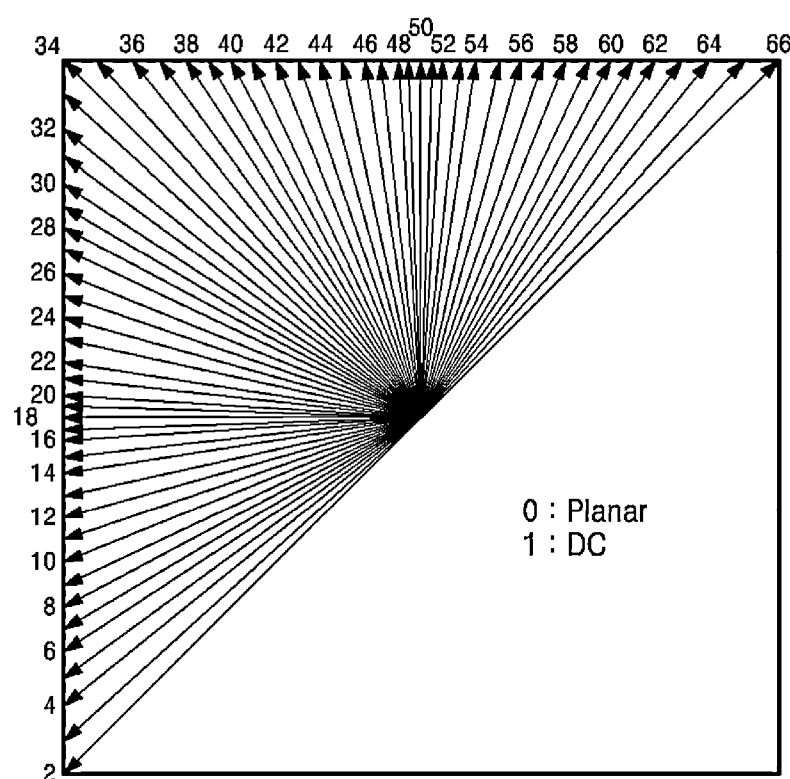
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
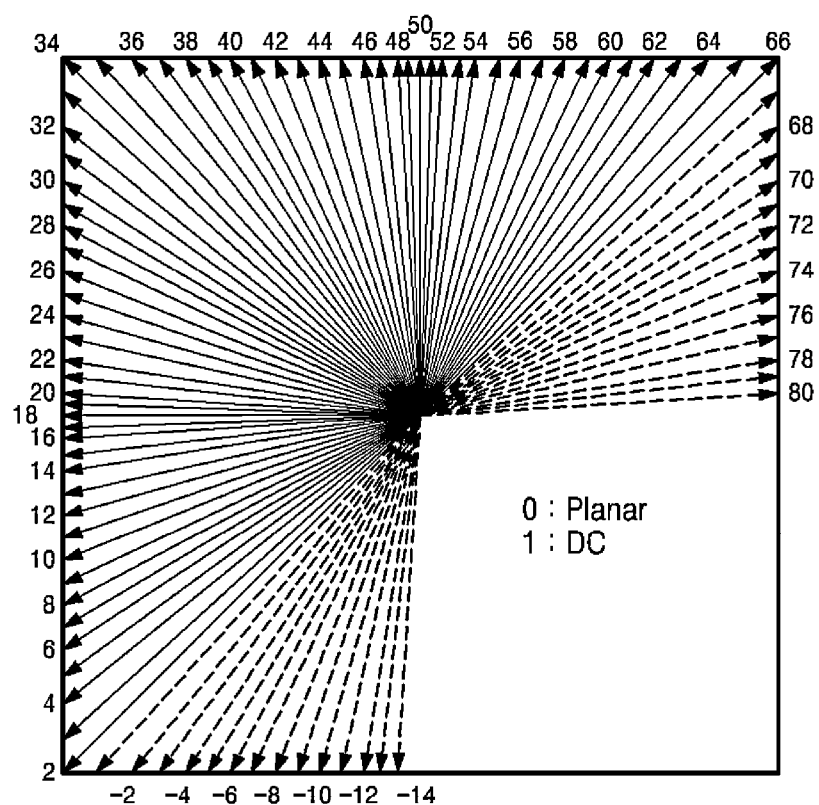

For efficient directional prediction for the current block having a rectangular shape, directional modes ( #67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
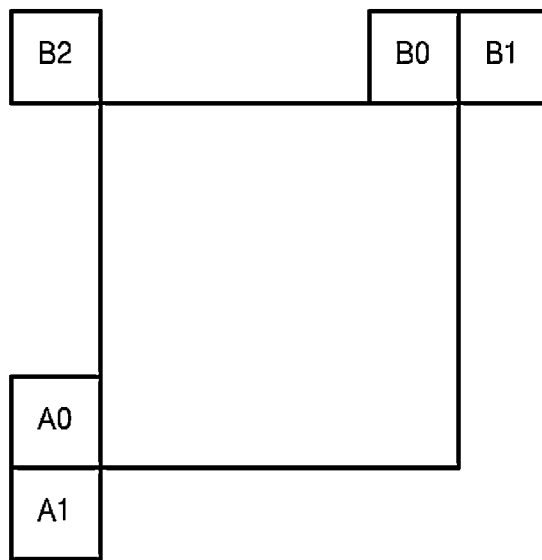
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_jdx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan.

In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
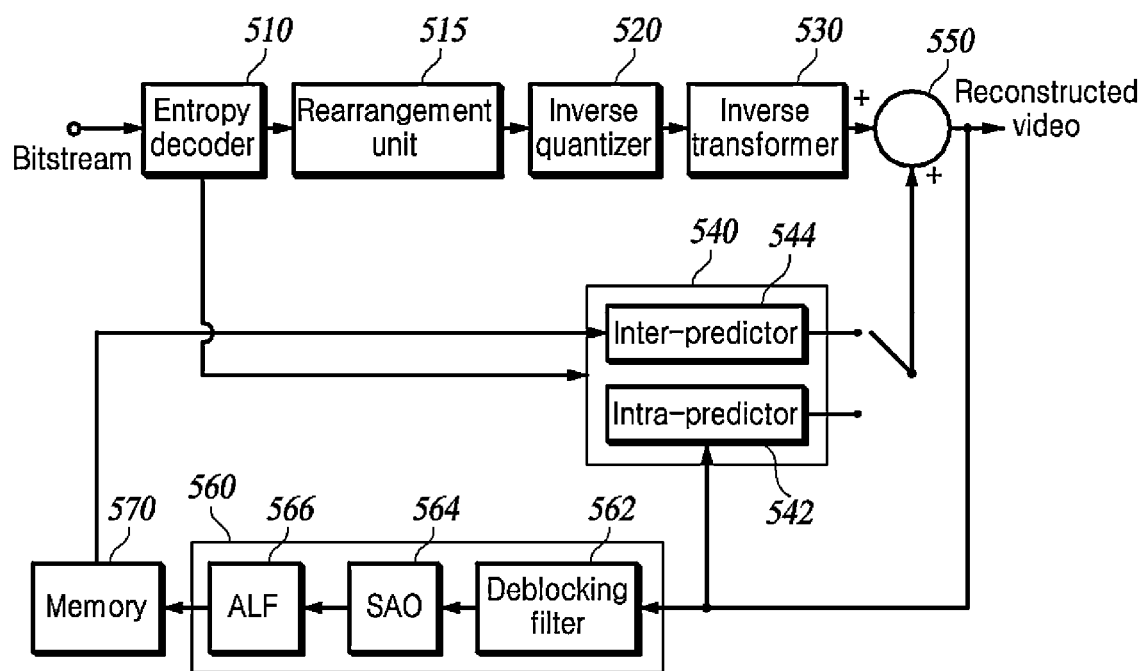
FIG. 5 is a block diagram of a video decoding apparatus according to an embodiment of the present disclosure.
Figure 6:
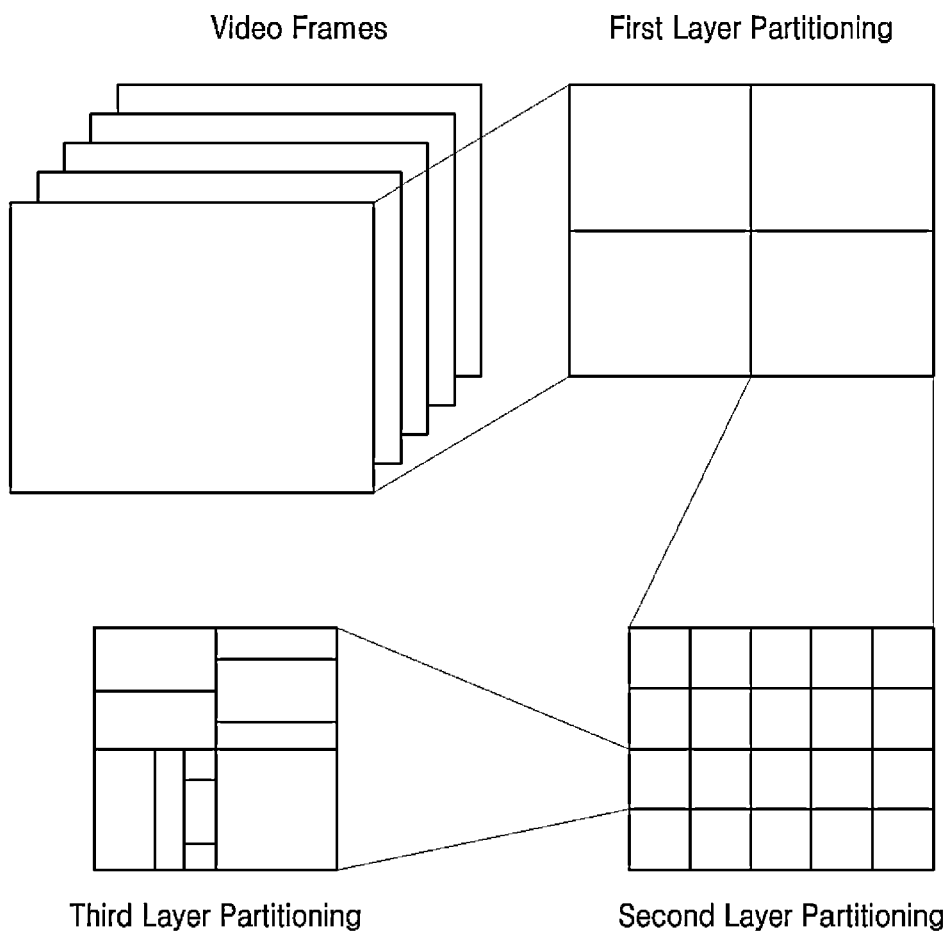
FIG. 6 is a diagram illustrating a hierarchical partition of a frame.

FIG. 5 is a functional block diagram of a video decoding apparatus in one embodiment of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus that encode/decode target blocks in a spiral scan order to allow the blocks located centrally of a video frame to utilize more previously reconstructed neighboring blocks.

The following embodiments may be applied to the picture splitter 110, the predictor 120, the transformer 140, the quantizer 145, the inverse quantizer 160, the inverse transformer 165, the loop filter unit 180, and the entropy encoder 155 in the video encoding apparatus. The following embodiments may also be applied to the entropy decoder 510, the inverse quantizer 520, the inverse transformer 530, the predictor 540, and the loop filter unit 560 in the video decoding apparatus.

In the following descriptions, the term 'target block' to be encoded/decoded may be used interchangeably with the current block or coding unit (CU) as described above, or the term 'target block' may refer to some area of the coding unit.

Figure 7:
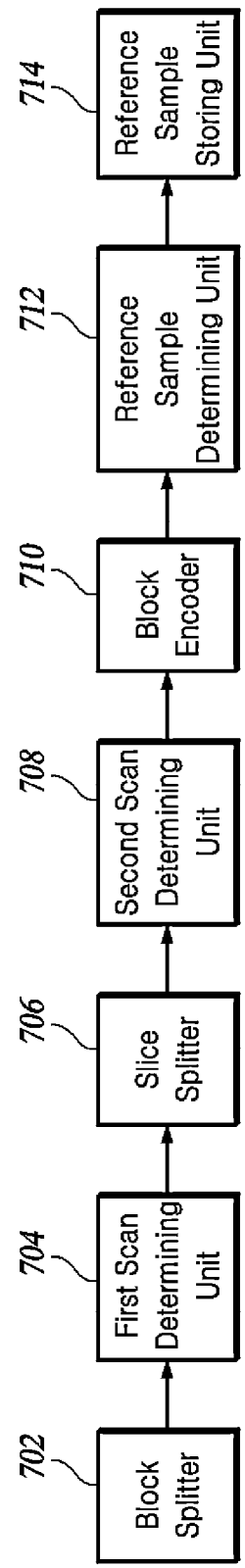
FIG. 7 is a block diagram conceptually illustrating a video encoding apparatus utilizing a spiral scan order, according to at least one embodiment of the present disclosure.

FIG. 7 is a block diagram conceptually illustrating a video encoding apparatus utilizing a spiral scan order, according to at least one embodiment of the present disclosure.

The video encoding apparatus according to at least one embodiment of the present disclosure utilizes a spiral scan order to encode a target block. The video encoding apparatus may include all or part of a block splitter 702, a first scan determining unit 704, a slice splitter 706, a second scan determining unit 708, a block encoder 710, a reference sample determining unit 712, and a reference sample storing unit 714. In the video encoding apparatus, the block splitter 702, the first scan determining unit 704, the slice splitter 706, and the second scan determining unit 708 correspond to a block partition step for encoding. Although described separately for convenience, the block splitter 702, the first scan determining unit 704, the slice splitter 706, and the second scan determining unit 708 perform the function of the picture splitter 110. Additionally, the block encoder 710, the reference sample determining unit 712, and the reference sample storing unit 714 correspond to the encoding and post-processing steps of the target block. The block encoder 710, the reference sample determining unit 712, and the reference sample storing unit 714 perform the functions of the predictor 120, the transformer 140, the quantizer 145, the inverse quantizer 160, the inverse transformer 165, the loop filter unit 180, and the entropy encoder 155.

The block splitter 702 partitions the input video frame into blocks of the same size.

The first scan determining unit 704 obtains a location of a start block for encoding the partitioned blocks and obtains the scan order according to the start block. Hereinafter, the method obtained by the first scan determining unit 704 is designated as a first block-scan scheme. The video encoding apparatus may calculate the location of a start block for encoding a frame and the scan order according to the start block from the perspective of optimizing rate distortion. The first scan determining unit 704 may obtain the location of the start block for encoding the frame and the scan order according to the start block, determined at a high-level, as the first block-scan scheme. The video encoding apparatus may encode the position information of the start block and the scan scheme to generate and deliver a bitstream to the video decoding apparatus.

FIGS. 8A, 8B, 8C, and 8D are diagrams illustrating the locations of start blocks in the current layer, and illustrating scan orders according to the start blocks.

The start block of the current layer may be one of the top-left, top-right, bottom-left, and bottom-right blocks. In the examples of FIGS. 8A, 8B, 8C, and 8D, the block labeled 0 (zero) represents the start block. Further, the numbers and arrows within each block indicate the encoding/decoding order in the current layer.

The first scan determining unit 704 may use one of a horizontal scan order, a vertical scan order, a clockwise spiral scan order, or a counterclockwise spiral scan order as the scan scheme.

Figure 8A:
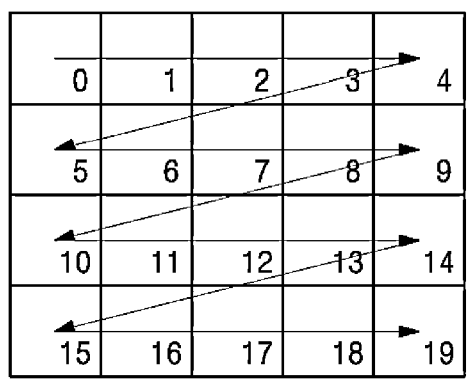
FIGS. 8A, 8B, 8C, and 8D are diagrams illustrating the locations of start blocks in the current layer and illustrating scan orders based on the start blocks.
Figure 8A:
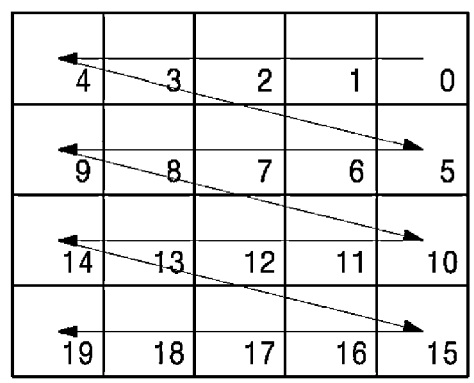
Figure 8A:
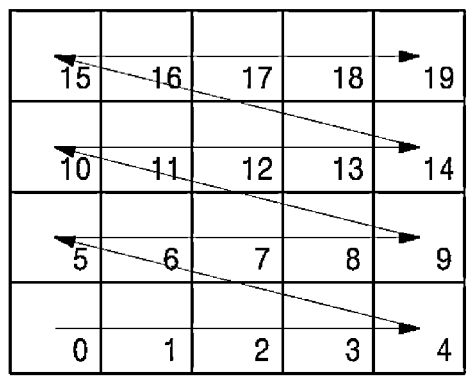
Figure 8A:
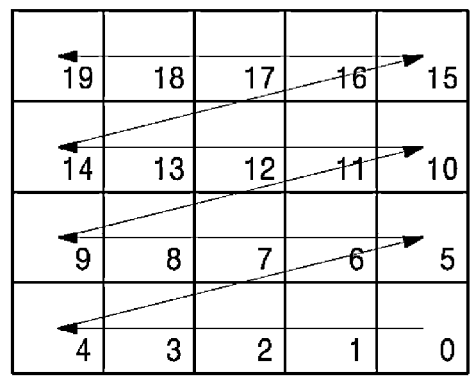
Figure 8B:
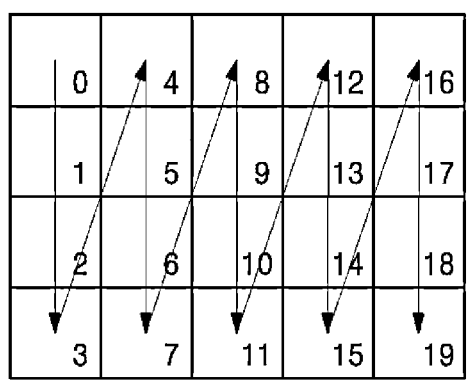
Figure 8B:
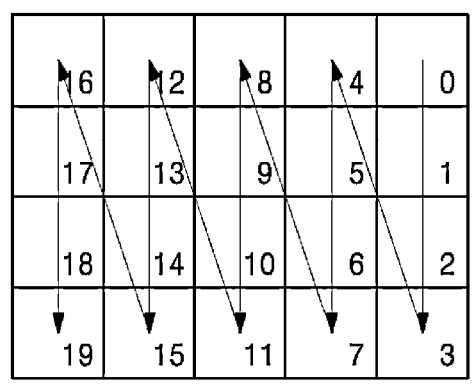
Figure 8B:
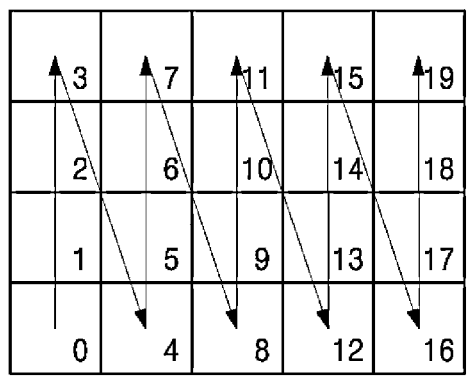
Figure 8B:
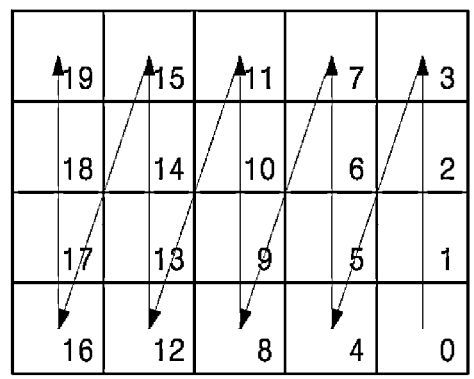
Figure 8C:
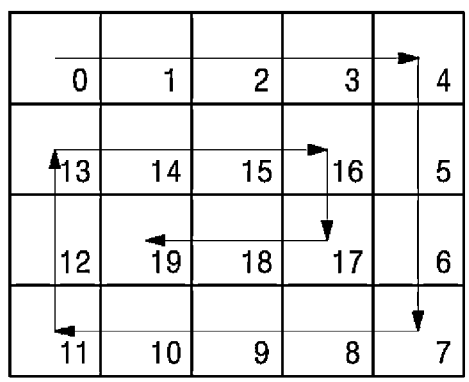
Figure 8C:
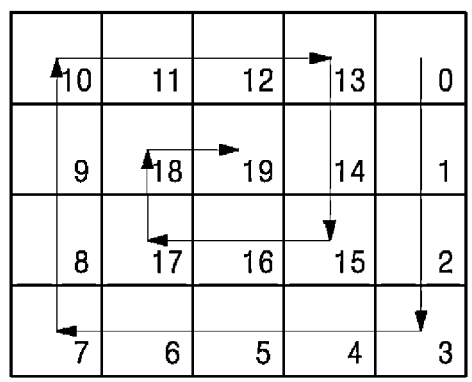
Figure 8C:
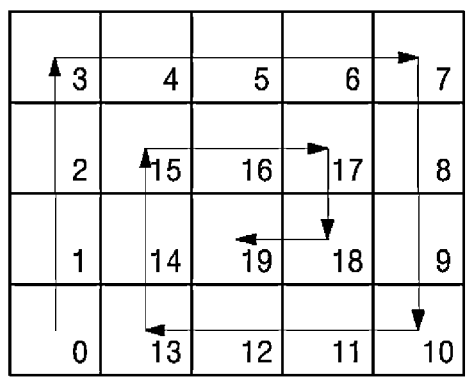
Figure 8C:
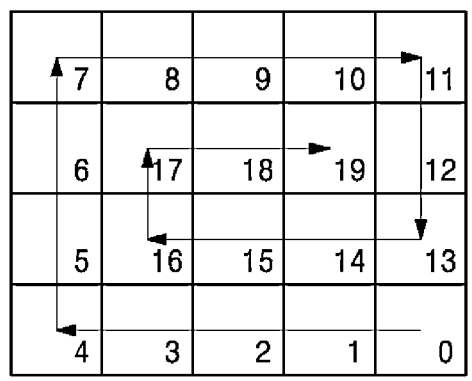
Figure 8D:
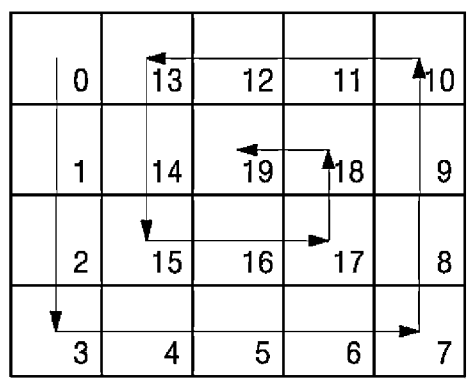
Figure 8D:
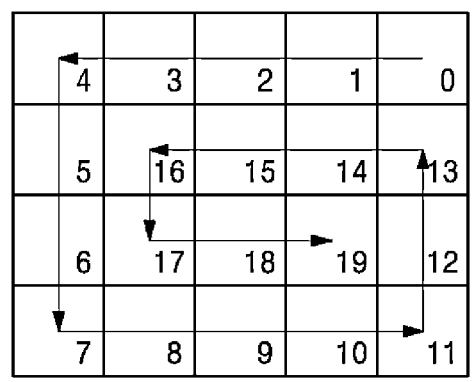
Figure 8D:
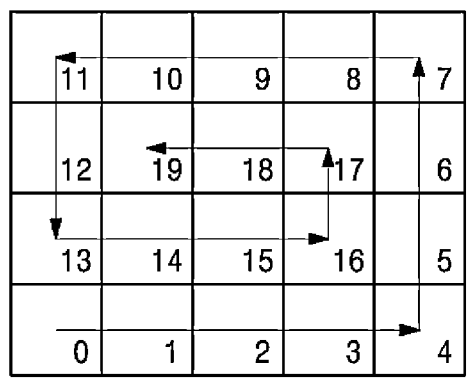
Figure 8D:
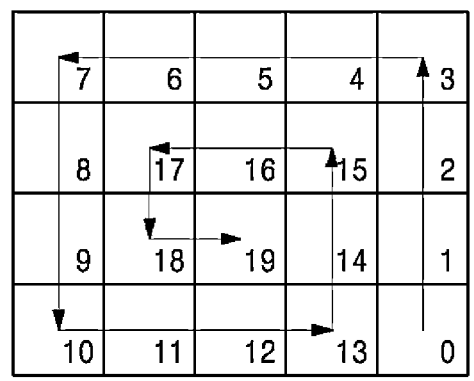

When the horizontal scan or the vertical scan is utilized, each block may utilize information on one or two previously reconstructed neighboring blocks, as shown in the examples of FIGS. 8A and 8B. In contrast, when the spiral scan is utilized, the number of neighboring blocks whose information is available to the target block increases as the spiral scan approaches the center of the current layer, as shown in the examples of FIGS. 8C and 8D. For example, as the target block approaches the center from the edge of the current layer, the number of neighboring blocks whose information is available may increase up to four.

Meanwhile, the same scan orders as in the example of FIGS. 8A and 8D may be utilized by the video decoding apparatus in the process of decoding the block.

The slice splitter 706 determines a slice partition scheme according to the location of the start block determined for the frame and determines the type of scanning scheme, i.e., the first block-scan scheme, and then the slice splitter 706 uses the determined partition scheme to partition the frame into slices.

Figure 9:
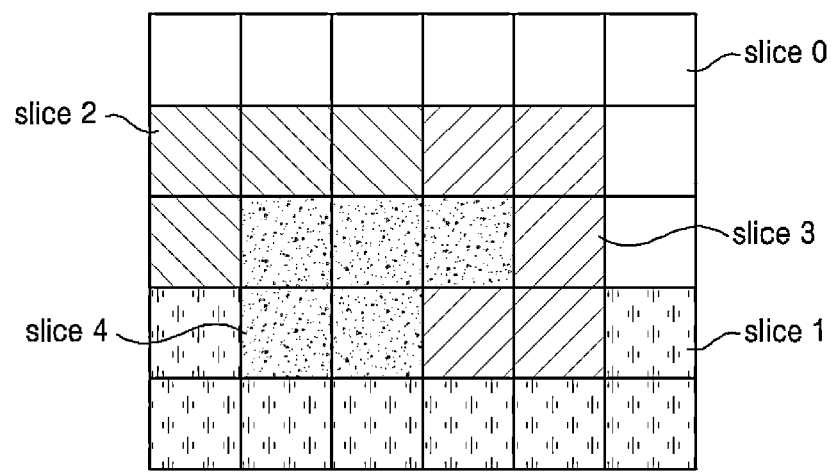
FIG. 9 is a diagram illustrating a slice partitioning according to at least one embodiment of the present disclosure.

FIG. 9 is a diagram illustrating a slice partitioning according to at least one embodiment of the present disclosure.

A slice represents an individually encodable unit. A slice may include one or more blocks. The slice splitter 706 may generate slices by bundling a certain number of blocks in a clockwise spiral scan order, such as in the example of FIG. 9, when the block-scan scheme in the current layer is the clockwise spiral scan order. At this time, the video encoding apparatus may encode the starting position of each slice and the number of blocks included in the slice at an higher layer than the current layer and may transmit the encoded starting position and the encoded number of blocks to the video decoding apparatus.

Meanwhile, the slice partitioning according to the example of FIG. 9 may be utilized by the video decoding apparatus in the process of decoding the blocks.

The second scan determining unit 708 follows the first block-scan scheme to determine a start block position and a scanning scheme for each slice's blocks. Hereinafter, the method determined by the second scan determining unit 708 is referred to as a second block-scan scheme. In this case, the start block position and scan order utilized in the first block-scan scheme may be different from the start block position and scan order utilized in the second block-scan scheme. The video encoding apparatus may calculate a start block position for encoding a slice and a scan order according to the start block from the perspective of optimizing rate distortion. The video encoding apparatus may encode the location information of the start block in the slice and the scan scheme to generate and transfer a bitstream to the video decoding apparatus.

The second scan determining unit 708 may represent the starting position of the slice by an index of a block expressed as a scan order. Alternatively, the starting position of the slice may be an order of blocks in the x-axis direction and an order of blocks in the y-axis direction. In this case, the starting reference points of the x and y axes may be different depending on the block-scan scheme. For example, in the example of FIGS. 8A, 8B, 8C, and 8D, if the start block position is the top right block, the video encoding apparatus may set the top right block's coordinate to (0, 0) and may express the positions of the blocks relative to the top right block.

In the embodiment illustrated in FIG. 7, the frame unit corresponds to the high layer and the slice unit corresponds to the current layer. The video encoding apparatus may transfer for each layer the location of the start block and the scan scheme to the video decoding apparatus. Alternatively, the video encoding apparatus may use, as the start block location and scan scheme of the current layer, the orientation of the start block and scan scheme of a high layer. The video encoding apparatus may further transfer flag information to the video decoding apparatus indicating whether to use the same scan scheme as in the high layer. Alternatively, the video encoding apparatus and the video decoding apparatus may utilize the same predetermined scan scheme for each layer.

The block encoder 710 encodes each of the blocks in the order determined by the second block-scan scheme. As described above, the process performed by the video encoding apparatus for encoding each of the blocks may include all or part of the prediction, transform, quantization, loop filtering, and entropy encoding.

The reference sample determining unit 712 determines reference sample lines to be stored for future use in the encoded current block and determines line buffers for storing the determined reference sample lines.

Figure 10:
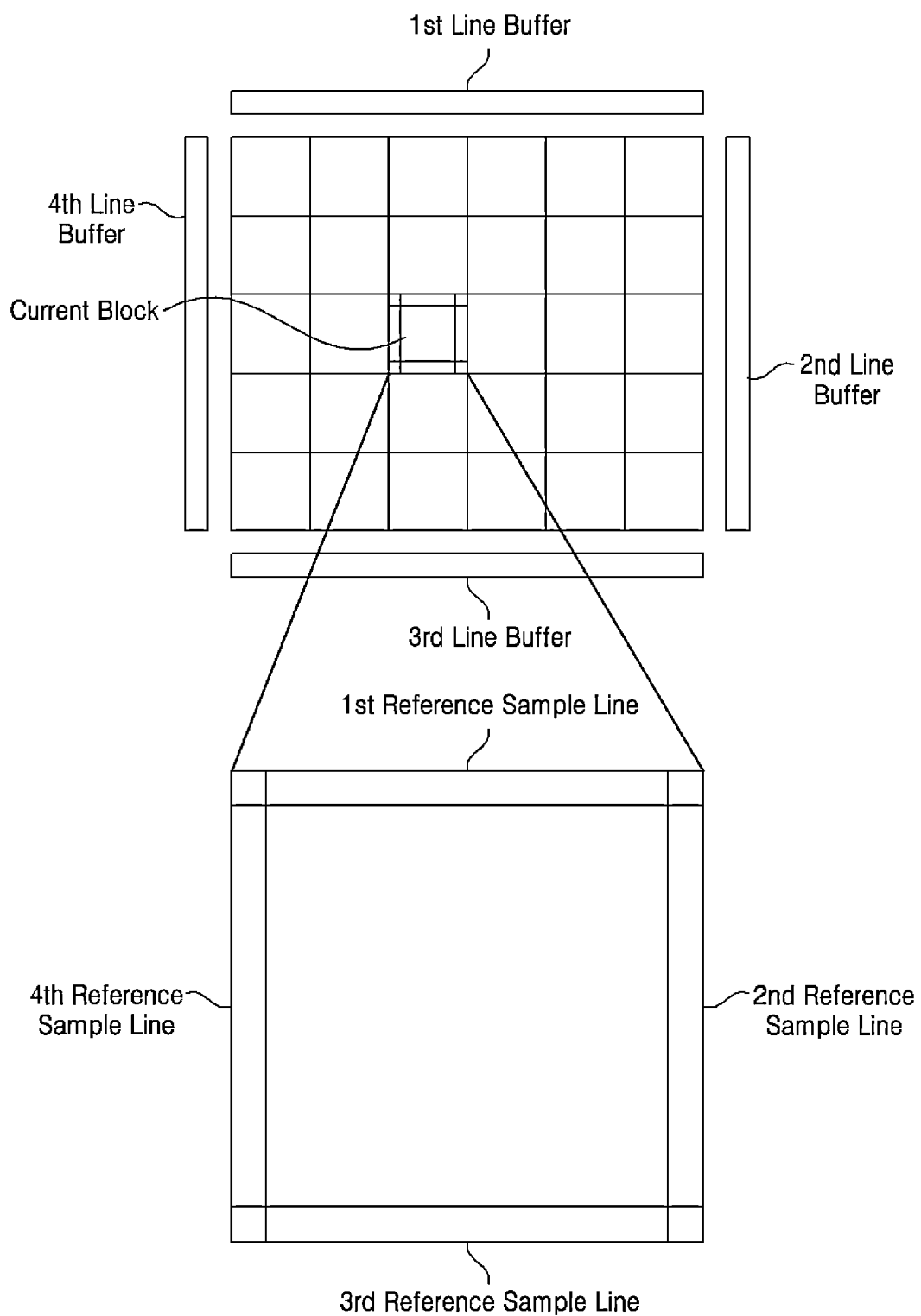
FIG. 10 is a diagram illustrating line buffers used for encoding/decoding and locations of reference sample lines stored in the line buffers, according to at least one embodiment of the present disclosure.

FIG. 10 is a diagram illustrating line buffers used for encoding/decoding and locations of reference sample lines stored in the line buffers, according to at least one embodiment of the present disclosure.

After the current block is encoded, some information on the current block needs to be stored in line buffers for encoding subsequent blocks. For this purpose, four or more line buffers may be required. The video encoding apparatus may utilize four lines corresponding to the boundaries of the current block as reference sample lines, as shown in the example of FIG. 10. Here, the reference sample lines and the line buffers have the same designations as in FIG. 10.

The information on the reference sample lines may be stored in at least one line buffer. The line buffer for storing the information may be determined to be proximate to a boundary of a subsequently encoded block to facilitate utilization by the subsequently encoded block. For example, as shown in the example of FIG. 10, the video encoding apparatus may store information on a first reference sample line at the current block's top boundary in a third line buffer. Similarly, the video encoding apparatus may store information on a second reference sample line at the current block's right boundary in a fourth line buffer. Further, information on a third reference sample line may be stored in a first line buffer. Further, information on the fourth reference sample line may be stored in a second line buffer.

The video encoding apparatus may skip storing the information of some of the reference sample lines depending on the position of the current block. For example, if the position of the current block is the topmost block of a frame, slice, and tile, the information of the first reference sample line does not need to be stored because it is not referenced by subsequent blocks. Therefore, the video encoding apparatus may omit to store the information of the first reference sample line.

The video encoding apparatus may skip storing the information of some reference sample lines depending on the scan scheme. For example, a horizontal scan scheme where the top left block is the start block always utilizes only the second reference sample line and the third reference sample line. Therefore, the video encoding apparatus may skip storing the information on the first reference sample line and the fourth reference sample line.

The video encoding apparatus may determine which reference sample lines to store based on whether the current block and its neighbors have already been encoded. For example, in a horizontal scan scheme with the top-left block designated as the start block, the video encoding apparatus may be responsive to the blocks above and to the left of the current block as having not yet been encoded/decoded for storing the first reference sample line and the fourth reference sample line in the line buffers.

The information on the reference sample line may include reconstructed sample values. Further, the information on the reference sample line may include information related to intra prediction and may include information related to inter prediction. Further, the information on the reference sample line may include information on transform and quantization, information on filtering, and information on entropy encoding.

Meanwhile, the same process of determining the location of the line buffers and the reference sample lines stored in the line buffers as the example of FIG. 10 may be utilized in the process of decoding the block by the video decoding apparatus.

The reference sample storing unit 714 stores the information on the determined reference sample lines in the corresponding line buffers.

Figure 11:
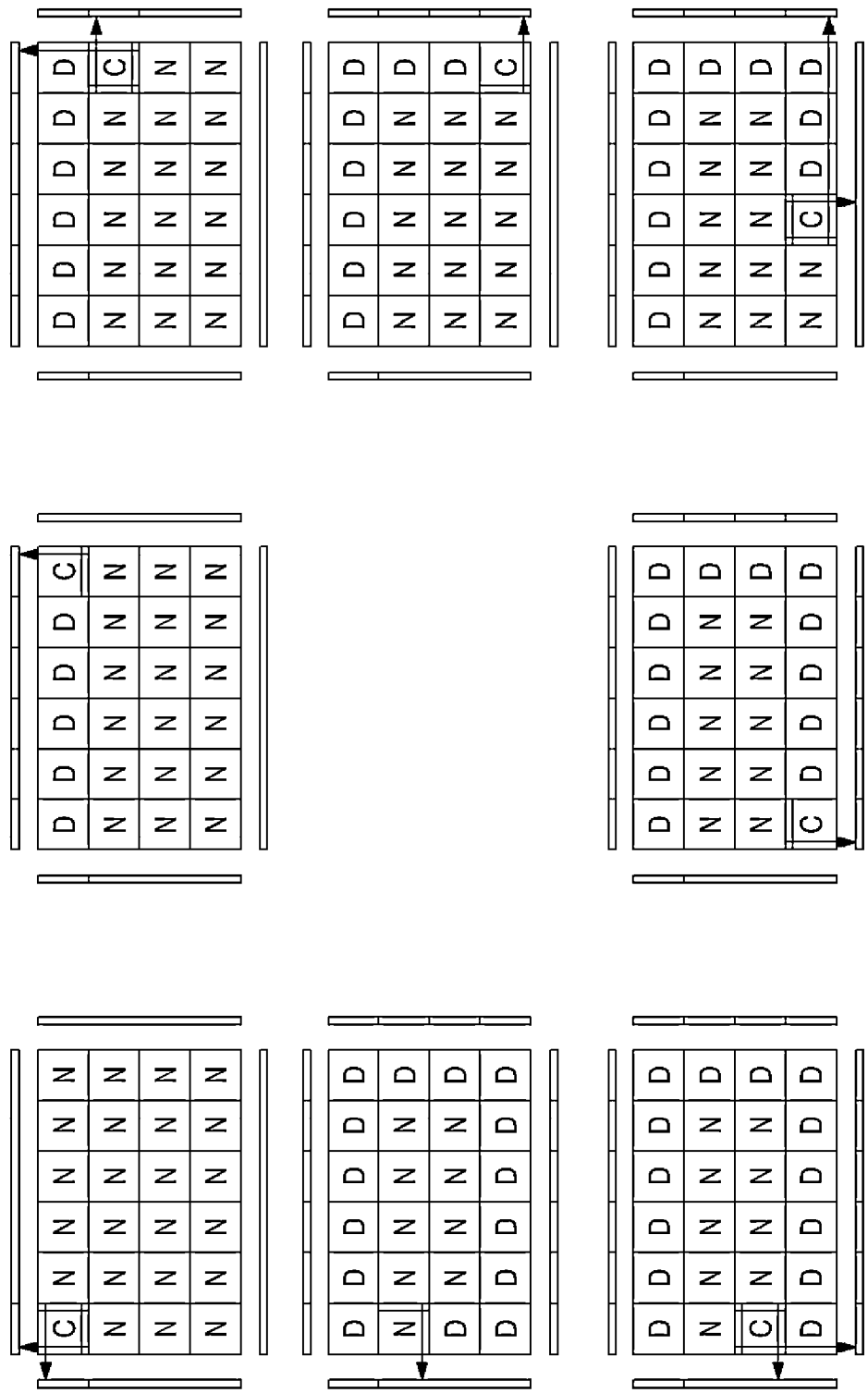
FIG. 11 is a diagram illustrating the locations of line buffers and reference sample lines stored following a clockwise spiral scan order, according to at least one embodiment of the present disclosure.

FIG. 11 is a diagram illustrating the locations of line buffers and reference sample lines stored following a clockwise spiral scan order, according to at least one embodiment of the present disclosure.

FIG. 11 illustrates an encoding/decoding sequence following the spiral scan order where the top left block is the start block. In the example of FIG. 11, a block C is the current block being encoded/decoded, a block D is the done block having been encoded/decoded, and a block N is the next block to be encoded/decoded. The arrow attached to each block indicates the process of storing the determined reference sample line in the corresponding line buffer.

Meanwhile, the video encoding apparatus may generate a high-level syntax for all of the partition information associated with the first block-scan scheme and the second block-scan scheme, as described above, and may transfer the generated syntax to the video decoding apparatus. Alternatively, the video decoding apparatus may derive all or some of this partition information based on an advance agreement.

Figure 12:
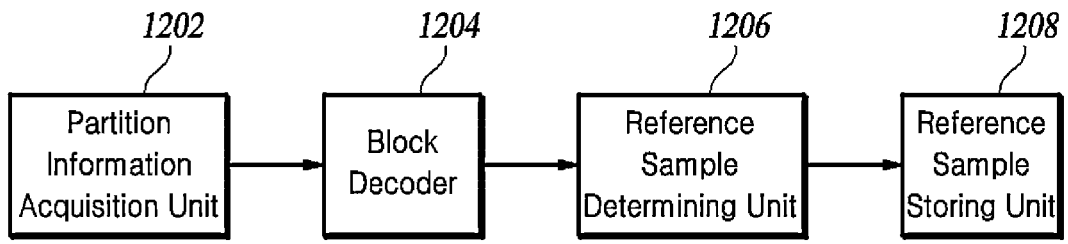
FIG. 12 is a block diagram conceptually illustrating a video decoding apparatus utilizing a spiral scan order, according to at least one embodiment of the present disclosure.

FIG. 12 is a block diagram conceptually illustrating a video decoding apparatus utilizing a spiral scan order, according to at least one embodiment of the present disclosure.

The video decoding apparatus according to the present embodiment decodes a target block by using a spiral scan order. The video decoding apparatus may include all or part of a partition information acquisition unit 1202, a block decoder 1204, a reference sample determining unit 1206, and a reference sample storing unit 1208. The partition information acquisition unit 1202 in the video decoding apparatus corresponds to a step of obtaining block partition information for decoding and performs the function of the entropy decoder 510. Additionally, the block decoder 1204, the reference sample determining unit 1206, and the reference sample storing unit 1208 correspond to the decoding and post-processing steps of the target block and perform the functions of the inverse quantizer 520, the inverse transformer 530, the predictor 540, and the loop filter unit 560.

The partition information acquisition unit 1202 may decode or derive block scan information, as described above. The block scan information includes all information related to the first block-scan scheme and the second block-scan scheme, as described above.

The first block-scan scheme in the block scan information is based on the scan order according to the example of FIG. 8A and FIG. 8D. Additionally, the second block-scan scheme in the block partition information may be based on the slice partitioning illustrated in FIG. 9.

The block decoder 1204 decodes each of the blocks following the order determined by the block scan information. As described above, the process performed by the video decoding apparatus for decoding each of the blocks may include all or part of the entropy decoding, inverse quantization, inverse transform, prediction, and loop filtering.

The reference sample determining unit 1206 determines, from the decoded current block, reference sample lines to be stored for future use and determines line buffers for storing the determined reference sample lines. The reference sample determining unit 1206 may determine the locations of the line buffers and the reference sample lines stored in the line buffers according to the example of FIG. 10.

The reference sample storing unit 1208 stores the information on the determined reference sample lines in the corresponding line buffers.

Hereinafter, with reference to FIGS. 13 and 14, a method for encoding/decoding a current layer in a spiral scan order is described.

Figure 13:
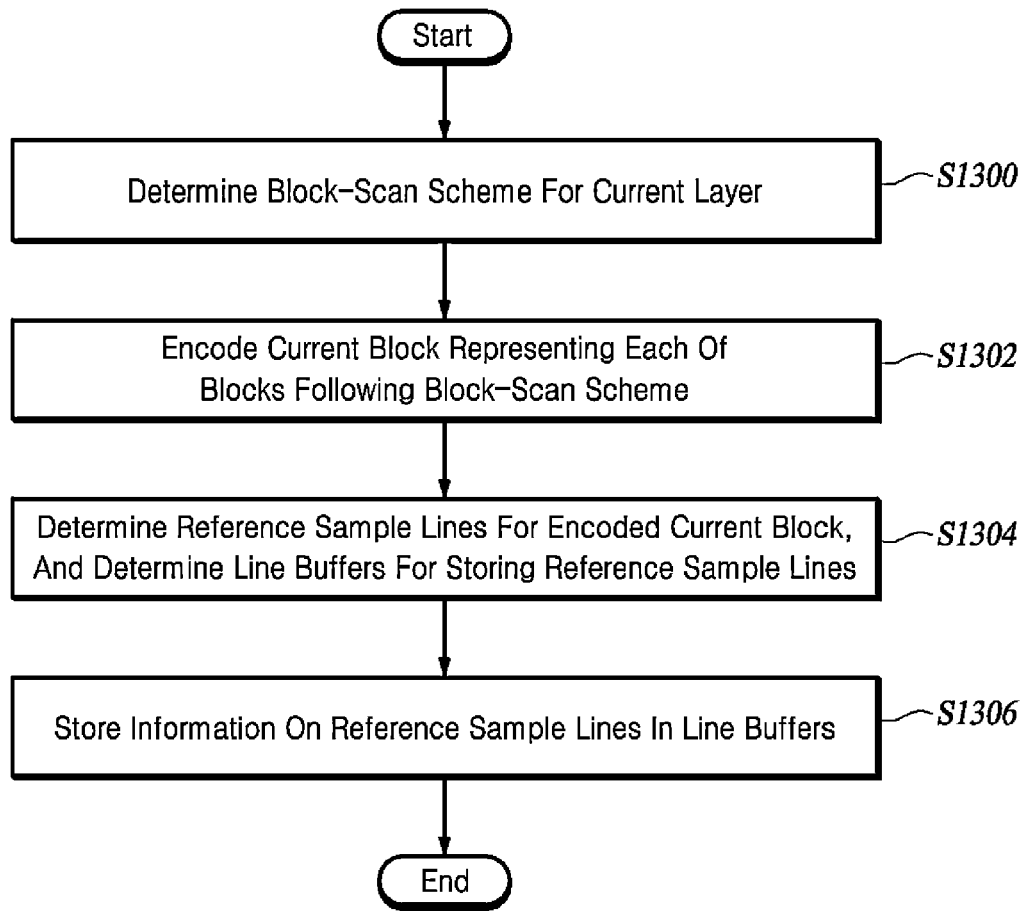
FIG. 13 is a flowchart of a video encoding method utilizing a spiral scan order, according to at least one embodiment of the present disclosure.

FIG. 13 is a flowchart of a video encoding method utilizing a spiral scan order, according to at least one embodiment of the present disclosure.

The video encoding apparatus determines a block-scan scheme for the current layer (S1300). Here, the block-scan scheme deals with equal-sized blocks from partitioning the current layer and includes a location of a start block and includes a scan order based on the start block. The scan order may be one of a horizontal scan order, a vertical scan order, a clockwise spiral scan order, and a counterclockwise spiral scan order. Further, the start block of the current layer may be one of a top-left block, a top-right block, a bottom-left block, or a bottom-right block.

On the other hand, the video encoding apparatus may obtain the block-scan scheme for the current layer from the high level or may inherit the orientation of a start block and a scan order at the high layer for use as the current block-scan scheme.

The video encoding apparatus encodes the current block representing each of the blocks following the block-scan scheme (S1302). As described above, the process performed by the video encoding apparatus for encoding each of the blocks may include all or part of the prediction, transform, quantization, loop filtering, and entropy encoding.

The video encoding apparatus determines reference sample lines for the encoded current block and determines line buffers for storing the reference sample lines (S1304).

The video encoding apparatus may utilize four sample lines corresponding to the boundaries of the current block as reference sample lines. The video encoding apparatus may determine the reference sample lines based on the position of the current block in the current layer, the scan order, and whether the blocks neighboring the current block have been encoded. The information on the reference sample lines may be stored in at least one line buffer. The line buffer for storing the information may be determined to be proximate to a boundary of a subsequently encoded block to facilitate use by the subsequently encoded block.

The video encoding apparatus stores information on the reference sample lines in line buffers (S1306). The information on the reference sample lines may include reconstructed sample values of the current block and information related to a prediction of the current block. Further, the information on the reference sample lines may include information related to the transform, quantization, filtering, and entropy encoding of the current block.

Figure 14:
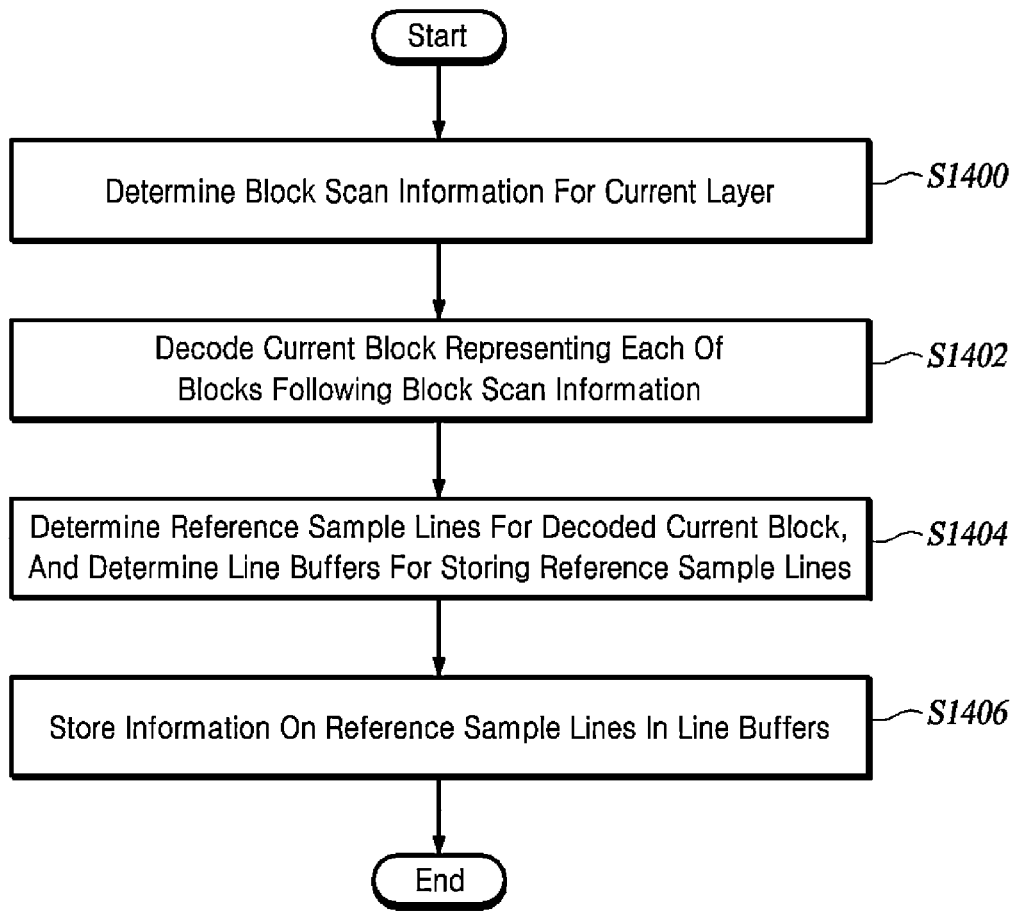
FIG. 14 is a flowchart of a video decoding method utilizing a spiral scan order, according to at least one embodiment of the present disclosure.

FIG. 14 is a flowchart of a video decoding method utilizing a spiral scan order, according to at least one embodiment of the present disclosure.

The video decoding apparatus determines block scan information for the current layer (S1400). Here, the block scan information deals with equal-sized blocks from partitioning the current layer and includes a location of a start block and a scan order based on the start block. The scan order may be one of a horizontal scan order, a vertical scan order, a clockwise spiral scan order, and a counterclockwise spiral scan order. Further, the start block of the current layer may be one of a top-left block, a top-right block, a bottom-left block, or a bottom-right block.

On the other hand, the video decoding apparatus may decode the block scan information of the current layer or may inherit the orientation of a start block and a scan order at a high layer for use as the block scan information of the current layer.

The video decoding apparatus decodes the current block representing each of the blocks following the block scan information (S1402). As described above, the process performed by the video decoding apparatus for decoding each of the blocks may include all or part of the entropy decoding, inverse quantization, inverse transform, prediction, or loop filtering.

The video decoding apparatus determines reference sample lines for the decoded current block and determines line buffers for storing the reference sample lines (S1404).

The video decoding apparatus may utilize four sample lines corresponding to the boundaries of the current block as reference sample lines. The video decoding apparatus may determine the reference sample lines based on the position of the current block in the current layer, the scanning order, and whether the blocks neighboring the current block have been decoded. The information on the reference sample lines may be stored in at least one line buffer. The line buffer for storing the information may be determined to be located close to a boundary of a subsequently decoded block to facilitate use by the subsequently decoded block.

The video decoding apparatus stores information on the reference sample lines in line buffers (S1406). The information on the reference sample lines may include reconstructed sample values of the current block and information related to the prediction of the current block. Further, the information on the reference sample lines may include information related to entropy decoding, inverse quantization, inverse transform, and filtering of the current block.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by ". . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the technical idea of the embodiments of the present disclosure is not limited by the illustrations. Accordingly, those having ordinary skill in the art to which this disclosure pertains should understand that the scope of the present disclosure should not be limited by the above explicitly described embodiments but by the claims and equivalents thereof.

| (Reference Numerals) | |
|---|---|
| 702: block splitter | 704: first scan determining unit |
| 706: slice splitter | 708: second scan determining unit |
| 710: block encoder | 712: reference sample determining unit |
| 714: reference sample storing unit | |

What is claimed is:

1. A method performed by a video encoding apparatus for encoding a current layer, the method comprising:
    determining a block-scan scheme for the current layer, the block-scan scheme including a location of a start block for blocks in the current layer and a scan order, wherein the scan order is one of a clockwise spiral scan order or a counterclockwise spiral scan order;
    encoding a current block of the blocks using at least one encoded neighboring block of the current block based on the block-scan scheme;
    determining at least one reference sample line for the current block;
    determining at least one line buffer for storing the at least one reference sample line; and
    storing information on the at least one reference sample line in the at least one line buffer.

2. The method of claim 1, wherein the start block is one of a top-left block, a top-right block, a bottom-left block, and a bottom-right block of the current layer.

3. The method of claim 1, wherein determining the block-scan scheme comprises:
    obtaining a block-scan scheme for the current layer from a high level, or inheriting an orientation of a start block and a scan order at a high layer for use as the block-scan scheme.

4. The method of claim 1, wherein encoding the current block comprises:
    performing all or part of a prediction, transform, quantization, loop filtering, or entropy encoding on the current block.

5. The method of claim 1, wherein determining the at least one reference sample line comprises:
    utilizing four sample lines corresponding to boundaries of the current block as the at least one reference sample line.

6. The method of claim 1, wherein determining the at least one reference sample line comprises:
    determining the at least one reference sample line based on a position of the current block in the current layer, the scan order for the current layer, and whether or not blocks neighboring the current block have been encoded.

7. The method of claim 1, wherein determining the at least one line buffer comprises:
    determining that a line buffer located close to a boundary of a block being subsequently encoded is a line buffer for storing the at least one reference sample line.

8. The method of claim 1, wherein the information on the at least one reference sample line comprises:
    reconstructed sample values of the current block; and
    information related to a prediction of the current block.

9. A method performed by a video decoding apparatus for decoding a current layer, the method comprising:
    determining block scan information for the current layer, the block scan information including a location of a start block for blocks in the current layer and a scan order, wherein the scan order is one of a clockwise spiral scan order or a counterclockwise spiral scan order;
    decoding a current block of the blocks using at least one encoded neighboring block of the current block based on the block scan information;
    determining at least one reference sample line for the current block;
    determining at least one line buffer for storing the at least one reference sample line; and
    storing information on the at least one reference sample line in the at least one line buffer.

10. The method of claim 9, wherein determining the block scan information comprises:
    decoding the block scan information for the current layer, or
    inheriting an orientation of a start block and a scan order at a high layer for use as the block scan information.

11. The method of claim 9, wherein decoding the current block comprises:
    performing all or part of an entropy decoding, inverse quantization, inverse transform, prediction, and loop filtering on the current block.

12. The method of claim 9, wherein determining the at least one reference sample line comprises:
utilizing four sample lines corresponding to boundaries of the current block as the at least one reference sample line.

13. The method of claim 9, wherein determining the at least one reference sample line comprises:
determining the at least one reference sample line based on a position of the current block in the current layer, the scan order for the current layer, and whether or not blocks neighboring the current block have been decoded.

14. The method of claim 9, wherein determining the at least one line buffer comprises:
determining that a line buffer located close to a boundary of a block being subsequently decoded is a line buffer for storing the at least one reference sample line.

15. The method of claim 9, wherein the at least one information on the reference sample line comprises:
reconstructed sample values of the current block, and information related to a prediction of the current block.

16. A method for transmitting a bitstream including encoded video data, the method comprising:
generating the bitstream for a current block in an image; and
transmitting the bitstream,
wherein generating the bitstream for the image comprises:
determining a block-scan scheme for a current layer, the block-scan scheme including a location of a start block for blocks in the current layer and a scan order, wherein the scan order is one of a clockwise spiral scan order or a counterclockwise spiral scan order;
encoding a current block of the blocks using at least one neighboring block of the current block based on the block-scan scheme;
determining at least one reference sample line for the current block based on a position of the current block in the current layer and the scan order for the current layer;
determining at least one line buffer for storing the at least one reference sample line; and
storing information on the at least one reference sample line in the at least one line buffer.

* * * * *